(12) United States Patent
Sippel et al.

(10) Patent No.: US 10,633,986 B2
(45) Date of Patent: Apr. 28, 2020

(54) PLATFORM WITH AXIAL ATTACHMENT FOR BLADE WITH CIRCUMFERENTIAL ATTACHMENT

(71) Applicants: Rolls-Royce Corporation, Indianapolis, IN (US); Rolls-Royce North American Technologies Inc., Indianapolis, IN (US)

(72) Inventors: Aaron D. Sippel, Zionsville, IN (US); Ted J. Freeman, Danville, IN (US); Loic Fabries, West Lafayette, IN (US)

(73) Assignees: Rolls-Roye Corporation, Indianapolis, IN (US); Rolls-Royce North American Technologies Inc., Indianapolis, IN (US)

(*) Notice: Subject to any disclaimer, the term of this patent is extended or adjusted under 35 U.S.C. 154(b) by 42 days.

(21) Appl. No.: 16/119,561

(22) Filed: Aug. 31, 2018

(65) Prior Publication Data

US 2020/0072064 A1 Mar. 5, 2020

(51) Int. Cl.
| | |
|---|---|
| *F01D 5/30* | (2006.01) |
| *F04D 29/32* | (2006.01) |
| *F01D 11/00* | (2006.01) |
| *B23P 15/00* | (2006.01) |

(52) U.S. Cl.
CPC .......... *F01D 5/3069* (2013.01); *B23P 15/006* (2013.01); *F01D 5/3038* (2013.01); *F01D 11/008* (2013.01); *F04D 29/322* (2013.01); *F05D 2220/323* (2013.01); *F05D 2230/60* (2013.01); *F05D 2240/30* (2013.01); *F05D 2240/80* (2013.01); *Y10T 29/49321* (2015.01)

(58) Field of Classification Search
CPC ...... F01D 5/3069; F01D 5/303; F01D 5/3038; F01D 11/008; F04D 29/322; F04D 29/34; F05D 2240/80; F05D 2230/60; F05B 2240/80; F05B 2230/60; Y10T 29/49321; B23P 15/006
USPC .................................................. 416/215–218
See application file for complete search history.

(56) References Cited

U.S. PATENT DOCUMENTS

| | | | | |
|---|---|---|---|---|
| 943,348 | A * | 12/1909 | Hodgkinson | F01D 5/3038 416/218 |
| 2,494,658 | A * | 1/1950 | Highberg | F01D 5/3069 416/215 |
| 3,923,420 | A * | 12/1975 | Chifos | F01D 5/3038 416/190 |
| 4,094,615 | A | 6/1978 | Glenn | |
| 4,280,795 | A | 7/1981 | Trousdell | |
| 4,684,325 | A * | 8/1987 | Arnold | F01D 5/3038 29/889.21 |
| 5,743,713 | A * | 4/1998 | Hattori | F01D 5/14 416/215 |
| 6,457,942 | B1 | 10/2002 | Forrester | |
| 7,284,958 | B2 | 10/2007 | Dundas et al. | |
| 7,972,113 | B1 | 7/2011 | Davies | |
| 8,608,446 | B2 | 12/2013 | Pickens et al. | |

(Continued)

*Primary Examiner* — Christopher Verdier
(74) *Attorney, Agent, or Firm* — Barnes & Thornburg LLP

(57) ABSTRACT

A wheel assembly for a gas turbine engine includes a disk, a plurality of blades, and a plurality of platforms. The disk is configured to rotate about an axis during operation of the gas turbine engine. The blades each include a circumferentially extending attachment feature that is received in the disk. The platforms each have an axially extending attachment feature that is received in the disk.

17 Claims, 6 Drawing Sheets

(56) References Cited

U.S. PATENT DOCUMENTS

| | | |
|---|---|---|
| 8,651,820 B2 | 2/2014 | Krikunov et al. |
| 8,662,826 B2 | 3/2014 | Willett, Jr. et al. |
| 8,727,730 B2 | 5/2014 | Liotta et al. |
| 8,840,374 B2 | 9/2014 | Garcia-Crespo et al. |
| 8,894,372 B2 | 11/2014 | Willett, Jr. et al. |
| 8,905,716 B2 | 12/2014 | Boyington |
| 9,057,278 B2 | 6/2015 | Howes et al. |
| 9,328,622 B2 | 5/2016 | Garcia-Crespo et al. |
| 9,453,422 B2 | 9/2016 | Hile et al. |
| 9,840,931 B2 | 12/2017 | Joshi et al. |
| 9,920,636 B2 | 3/2018 | Brandl |
| 2003/0143078 A1* | 7/2003 | Benedetto ............... F01D 5/303 416/219 R |
| 2007/0014667 A1 | 1/2007 | Pickens et al. |
| 2013/0149158 A1 | 6/2013 | Aiello et al. |
| 2016/0305260 A1 | 10/2016 | Freeman |
| 2018/0149026 A1 | 5/2018 | Vetters et al. |

\* cited by examiner

PLATFORM WITH AXIAL ATTACHMENT FOR BLADE WITH CIRCUMFERENTIAL ATTACHMENT

FIELD OF THE DISCLOSURE

The present disclosure relates generally to gas turbine engines, and more specifically to wheel assemblies for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the turbine may include turbine wheels having blades that comprise composite materials adapted to interact with the hot combustion products. In some turbine wheels, the blades may be coupled to a disk that supports the blades in a gas path of the engine. Coupling the composite blades with disks, for example, metallic disks, can present design challenges.

SUMMARY

The present disclosure may comprise one or more of the following features and combinations thereof.

A wheel assembly for a gas turbine engine may include a multi-piece disk, a blade adapted to interact with gases during use of the gas turbine engine, and a platform. The multi-piece disk may be adapted to rotate about an axis during use of the gas turbine engine. The multi-piece disk may include a fore-disk segment and an aft-disk segment located axially aft of the fore-disk segment to define a dovetail shaped blade-receiver channel that extends circumferentially around the axis. The blade may include a root located in the dovetail shaped blade-receiver channel and an airfoil that extends radially away from the root. The root may be dovetail shaped when viewed circumferentially relative to the axis. The platform may include an outer radial wall, a stem, and an attachment feature. The outer radial wall may be arranged partway about the blade to define a boundary of a flow path of the gases. The stem may extend radially inward from the outer radial wall. The attachment feature may be coupled with the stem and located in the dovetail shaped blade-receiver channel. The attachment feature may be dovetail shaped when viewed axially relative to the axis.

In some embodiments, the root of the blade may be formed to define an axially extending cutout. A portion of the attachment feature of the platform may be located in the cutout such that the root of the blade is configured to block radial outward movement of the platform during use of the gas turbine engine.

In some embodiments, the axially extending cutout may be defined by a mating surface of the root. The mating surface may engage directly the attachment feature of the platform.

In some embodiments, the fore-disk segment may include a fore body and a fore band. The fore band may extend circumferentially around the fore body to define a first portion of the dovetail shaped blade-receiver channel. The aft-disk segment may include an aft body and an aft band. The aft band may extend circumferentially around the aft body to define a second portion of the dovetail shaped blade-receiver channel. The fore band and the aft band may each be solid and continuous to block the root of the blade and the attachment feature of the platform from moving axially out of the dovetail shaped blade-receiver channel.

In some embodiments, the platform may include a fore wing and an aft wing. The fore wing may extend axially forward from the outer radial wall toward a front face of the fore-disk segment. The aft wing may extend axially rearward from the outer radial wall toward a rear face of the aft-disk segment.

In some embodiments, the platform may further include a fore support strut. The fore support strut may be coupled with the fore wing, the outer radial wall, and the stem of the platform.

In some embodiments, the fore-disk segment may be formed to define a strut-receiver slot that extends radially inward into the fore-disk segment. At least a portion of the fore support strut may be located in the strut-receiver slot.

According to another aspect of the present disclosure, a wheel assembly may include a disk, a blade, and a platform. The disk may be formed to define a blade-receiver channel that extends circumferentially around an axis. The blade may include a circumferentially extending root located in the blade-receiver channel and an airfoil that extends radially away from the root. The platform includes an outer radial wall, a stem, and an attachment feature. The outer radial wall may be arranged partway around the blade. The stem may extend radially inward from the outer radial wall. The axially extending attachment feature may be coupled with the stem and located in the blade-receiver channel.

In some embodiments, the root of the blade may be formed to define an axially extending cutout. A portion of the attachment feature of the platform may extend circumferentially into the cutout.

In some embodiments, the root of the blade may include a front surface and a rear surface that is spaced apart axially from the front surface. The front surface and the rear surface may engage the disk to block the blade from moving radially out of the blade-receiver channel. A portion of the root of the blade may overlap radially with a portion of the attachment feature of the platform to block radial outward movement of the platform.

In some embodiments, the disk may include a fore-disk segment and an aft-disk segment that is located axially aft of the fore-disk segment. The fore-disk segment may include a fore body and a fore band that extends circumferentially around the fore body to define a first portion of the blade-receiver channel. The aft-disk segment may include an aft body and an aft band that extends circumferentially around the aft body to define a second portion of the blade-receiver channel. The fore band and the aft band may be each solid and continuous to block the blade and the platform from moving axially out of the blade-receiver channel.

In some embodiments, the platform may include a fore wing and an aft wing. The fore wing may extend axially forward from the outer radial wall toward a front face of the disk. The aft wing may extend axially rearward from the outer radial wall toward a rear face of the disk.

In some embodiments, the platform may further include a fore support strut. The fore support strut may be coupled with the fore wing, the outer radial wall, and the stem of the platform.

In some embodiments, the disk may include a fore-disk segment and an aft-disk segment that is located axially aft of the fore-disk segment. The fore-disk segment may include a fore body and a fore band that extends circumferentially around the fore body to define a first portion of the blade-receiver channel. The fore band may be formed to define a strut-receiver slot that extends radially inward into the fore band. At least a portion of the fore support strut may be located in the strut-receiver slot.

In some embodiments, the fore support strut may include a fore engagement surface. The fore engagement surface may be one of a linear angled engagement surface or a radially extending engagement surface that is arranged parallel to a longitudinal axis of the disk.

In some embodiments, the root may be dovetail shaped when viewed circumferentially relative to the axis. The attachment feature may be dovetail shaped when viewed axially relative to the axis.

A method in accordance with the present disclosure may comprise a number of steps. The method may include providing a multi-piece disk that includes a first-disk segment and a second-disk segment, a blade that includes a circumferentially extending root and an airfoil that extends radially away from the root relative to an axis, and a platform that includes an outer radial wall, a stem, and an axially extending attachment feature, locating the root of the blade in a circumferentially extending passage formed in the first-disk segment, locating the attachment feature of the platform in the circumferentially extending passage formed in the first-disk segment, and moving the second-disk segment toward the first-disk segment to locate the root of the blade and the attachment feature of the platform in a circumferentially extending passage formed in the second-disk segment.

In some embodiments, the method may further include moving the platform relative to the blade to cause a portion of the root of the blade to overlap radially a portion of the attachment feature of the platform. In some embodiments, the root may be dovetail shaped when viewed circumferentially and the attachment feature may be dovetail shaped when viewed axially.

In some embodiments, the platform may include a first wing, a second wing, and a support strut. The first wing may extend axially away from the outer radial wall. The second wing may extend axially away from the outer radial wall. The support strut may be coupled with the first wing, the outer radial wall, and the stem of the platform.

These and other features of the present disclosure will become more apparent from the following description of the illustrative embodiments.

DETAILED DESCRIPTION OF THE DRAWINGS

Figure 1:
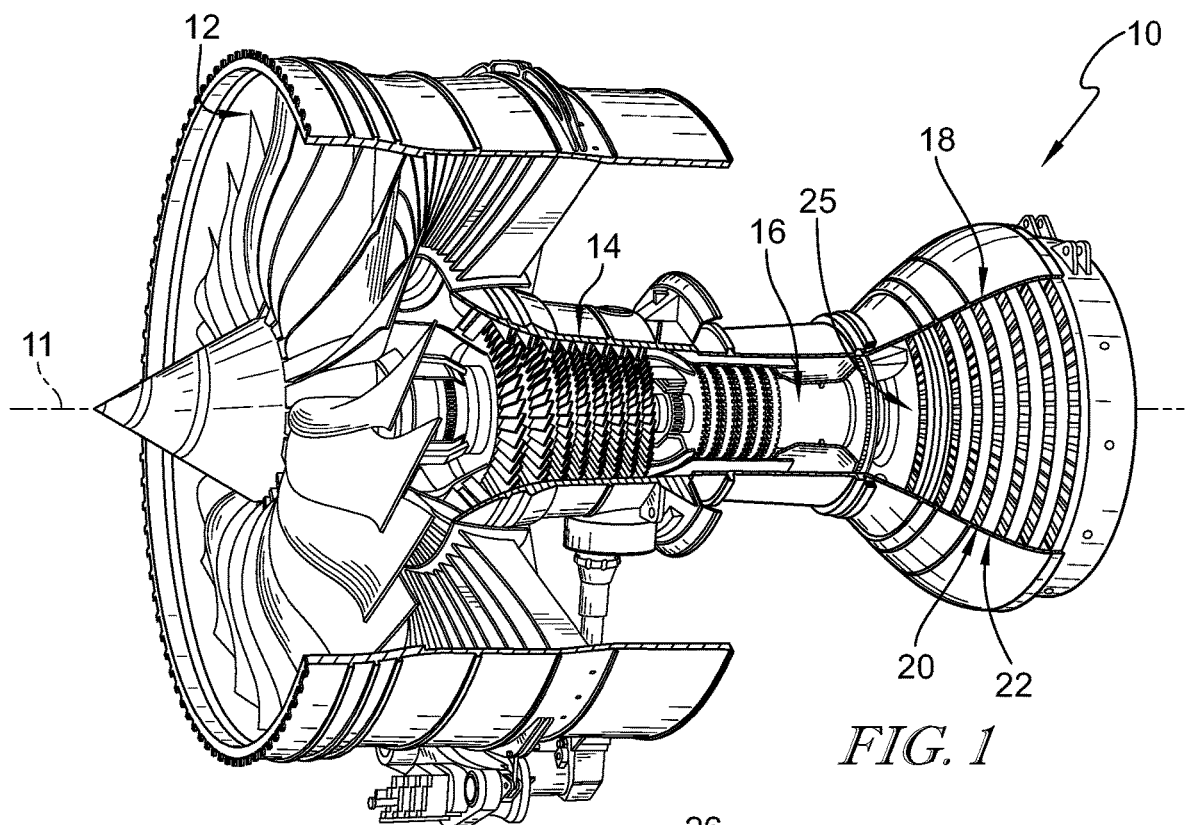
FIG. 1 is a cutaway view of a gas turbine engine that includes a fan, a compressor, a combustor, and a turbine and the turbine includes a plurality of turbine wheel assemblies in accordance with the present disclosure adapted to extract work from hot combustion products received from the combustor.

For the purposes of promoting an understanding of the principles of the disclosure, reference will now be made to a number of illustrative embodiments illustrated in the drawings and specific language will be used to describe the same.

Figure 2:
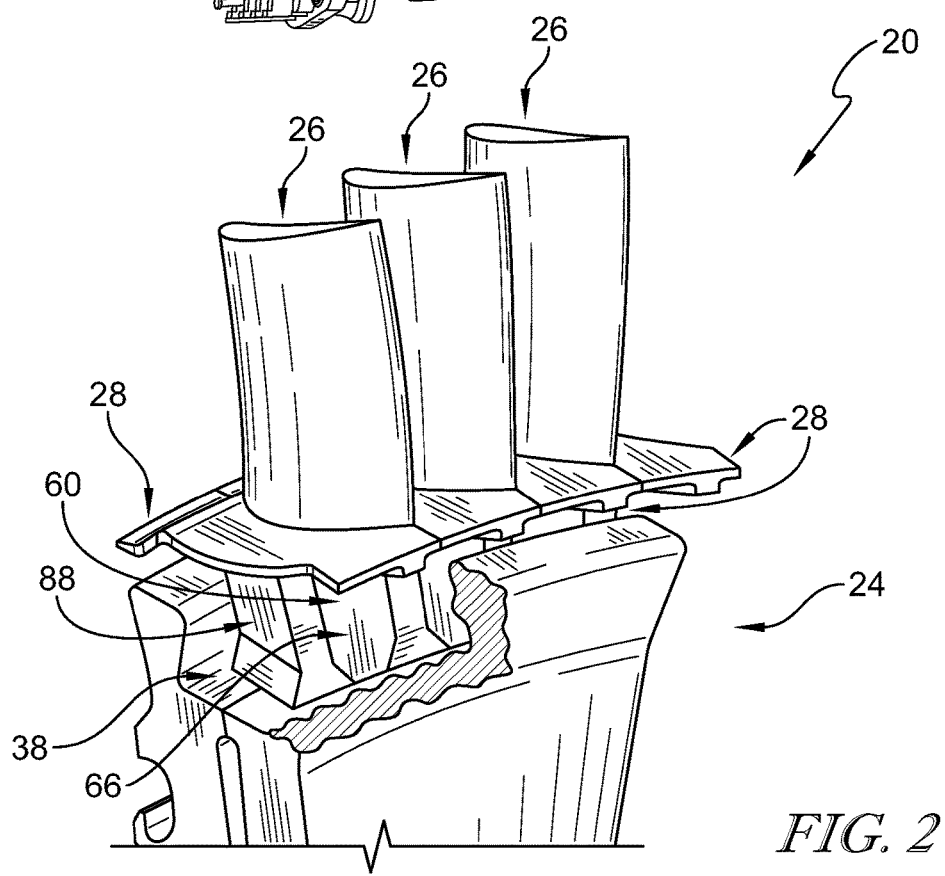
FIG. 2 is a perspective view of a portion of one of the turbine wheel assemblies included in the gas turbine engine of FIG. 1 showing that the turbine wheel assembly includes a multi-piece disk, a plurality of blades having circumferentially extending dovetail roots, and a plurality of platforms having axially extending dovetail roots located between the roots of the plurality of blades.

A wheel assembly 20 adapted for use with a gas turbine engine 10 includes a disk 24 and a plurality of blades 26 as shown in FIGS. 1 and 2. The disk 24 is adapted to retain the blades 26 and to rotate about a center axis 11 during operation of the gas turbine engine 10. The blades 26 include a root 60 and an airfoil 62 that extends radially away from the root 60 to interact with gases flowing through the gas turbine engine 10.

The disk 24 is formed to define a circumferentially extending blade-receiver channel 38 as shown in FIG. 2. The roots 60 of the blades 26 have circumferentially extending attachment features 66 that are located in the blade-receiver channel 38 of the disk 24 to couple the blades 26 with the disk 24. In illustrative embodiments, the wheel assembly 20 further includes a plurality of platforms 28 that define a boundary of a flow path 25 of the gases and that have axially extending attachment features 88 received in the blade-receiver channel 38 to couple the platforms 28 with the disk 24.

Illustratively, the blades 26 comprise ceramic matrix composite materials. Providing ceramic matrix composite blades 26 with attachment features 66 that extend circumferentially may allow the attachment feature 66 to be larger/thicker relative to typical metallic blades and may reduce the stress acting on the attachment feature 66. In illustrative embodiments, the platforms 28 are separate components from the blades 26 and are incorporated as an offloaded part. As a result, the blade attachments 66 may not support the centrifugal load associated with the platforms 28. The platforms 28 comprise ceramic matrix composite materials in the illustrative embodiment. In other embodiments, the blades 26 and/or the platforms 28 comprise metallic, monolithic ceramic, or composite materials.

The wheel assembly 20 is incorporated in the gas turbine engine 10 which includes a fan 12, a compressor 14, a combustor 16, and a turbine 18 as shown in FIG. 1. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine 18 includes a plurality of turbine wheel assemblies 20 and turbine vane assemblies 22 as suggested in FIG. 1. A portion of one of the turbine wheel assemblies 20 is shown in FIG. 2. Each turbine wheel assembly 20 is configured to interact with the hot combustion gases from the combustor 16 and rotate about the center axis 11 of the gas turbine engine 10 to generate power for driving the compressor 14 and the fan 12. A turbine vane assembly 22 is located between neighboring turbine wheel assemblies 20 to direct gases received from an upstream turbine wheel assembly 20 toward a downstream turbine wheel assembly 20.

The turbine wheel assembly 20 of FIG. 2 includes the disk 24, the plurality of blades 26, and the plurality of platforms 28. The disk 24 is coupled to a shaft of the gas turbine engine 10 and is configured to rotate the shaft about the center axis 11 during operation of the gas turbine engine 10 to generate power. The plurality of blades 26 are shaped to interact with and be rotated by the hot gases that move axially along the flow path 25 of the gas turbine engine 10. The platforms 28 are located between blades 26 and are arranged circumferentially about the disk 24 to form the boundary of the flow path 25 of the gas turbine engine 10.

Figure 3:
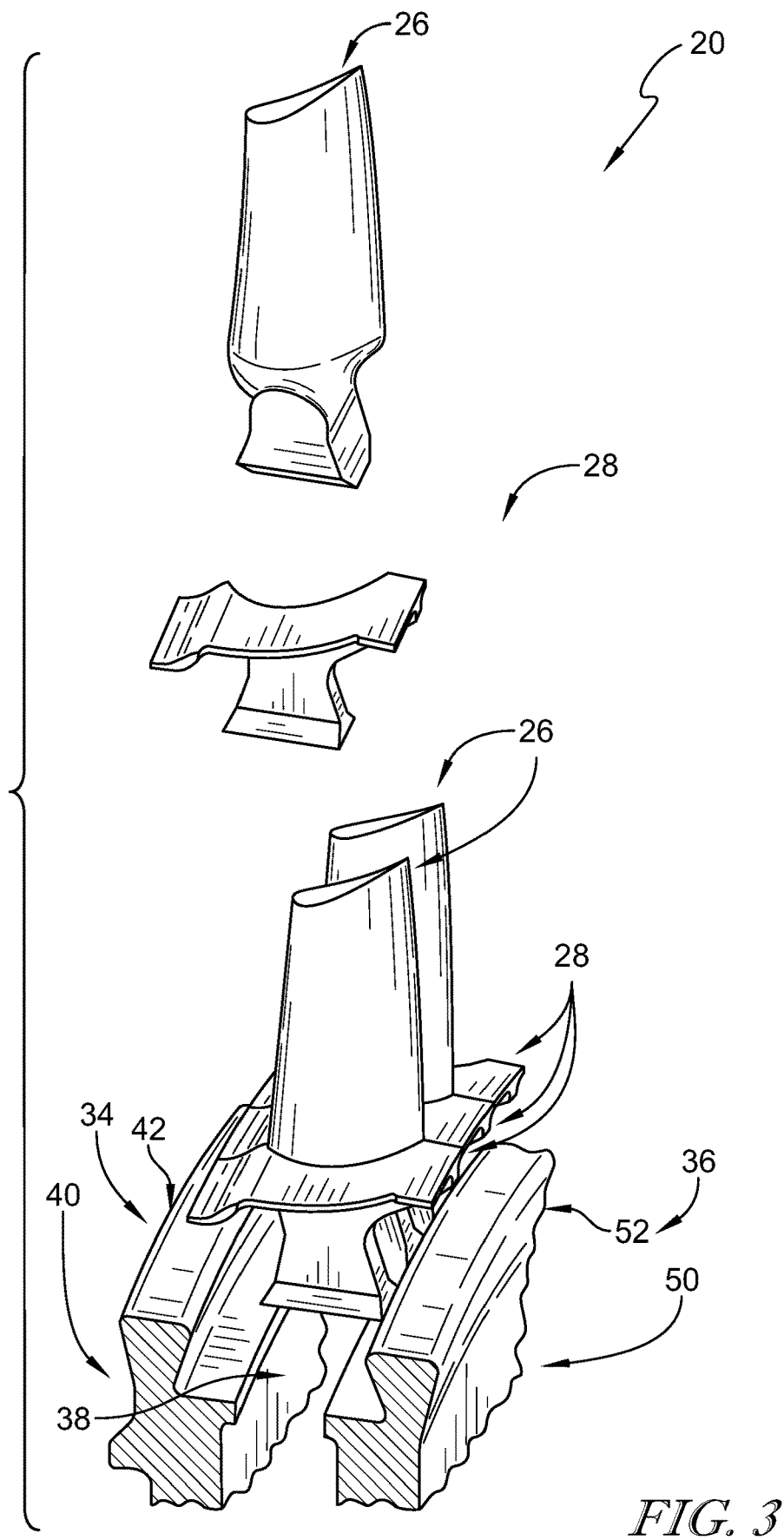
FIG. 3 is an exploded view of the turbine wheel assembly of FIG. 2 showing fore and aft disk segments, a plurality of blades and a plurality of platforms and their attachment features.

The disk 24 is illustratively a multi-piece disk 24 that includes a fore-disk segment 34 and an aft-disk segment 36 as shown in FIGS. 2 and 3. The multi-piece disk 24 is adapted to rotate about the axis 11 during use of the gas turbine engine 10. The aft-disk segment 36 is located axially aft of the fore-disk segment 34 to define a blade-receiver channel 38 between the fore-disk segment 34 and the aft-disk segment 36. The blade-receiver channel 38 extends circumferentially around the axis 11 and is sized to receive a portion of the blades 26 and the platforms 28. In the illustrative embodiment, the blade-receiver channel 38 is dovetail shaped when viewed circumferentially. The fore-disk segment 34 and the aft-disk segment 36 are made of metallic materials in the illustrative embodiment.

Figure 4:
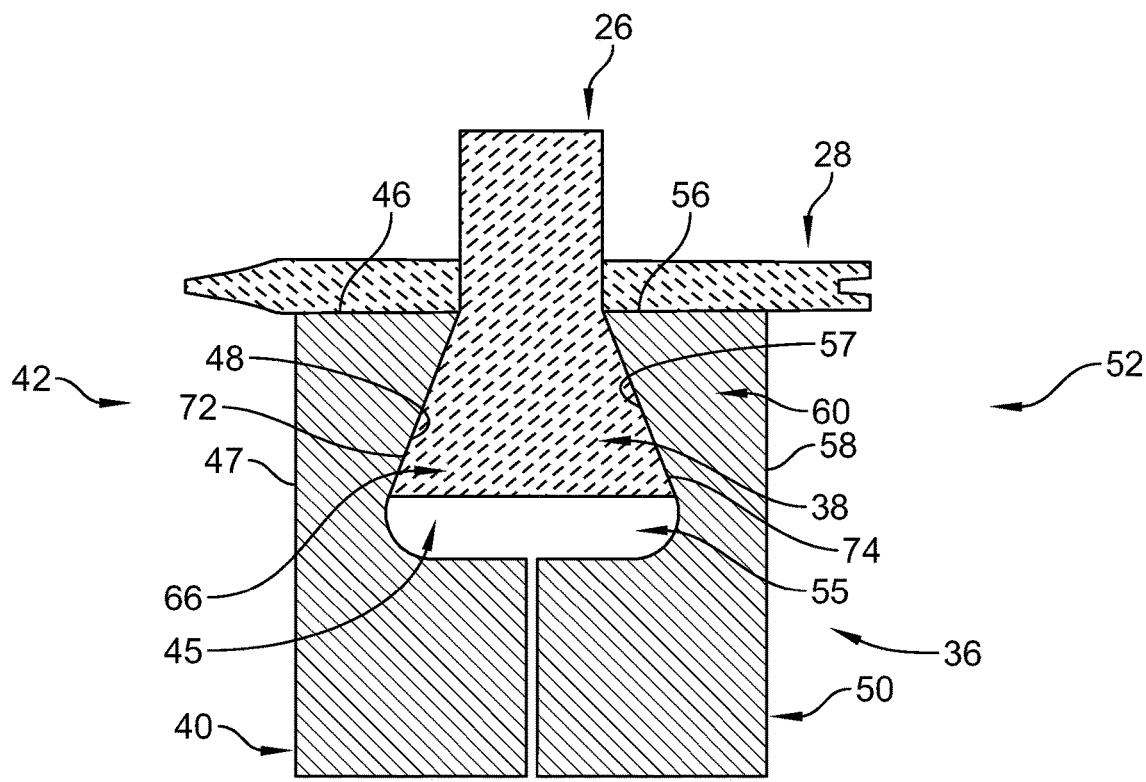
FIG. 4 is a diagrammatic and an enlarged circumferential sectional view of a portion of the turbine wheel assembly of FIG. 2 showing the interface of the blade root with the multi-piece disk.

The fore-disk segment 34 includes a fore body 40 and a fore band 42 that extends circumferentially around the fore body 40 as shown in FIGS. 2-4. The fore body 40 is configured to couple with the shaft of the gas turbine engine 10 to transmit power to the shaft. The fore band 42 extends radially away from the fore body 40 and cooperates with the fore body 40 to define a circumferentially extending passage 45 that forms a portion of the blade-receiver channel 38 as shown in FIG. 4.

The fore band 42 includes an outer radial surface 46, a fore-facing surface 47, and an aft-facing engagement surface 48 as shown in FIG. 4. The aft-facing engagement surface 48 extends from the outer radial surface 46 toward the fore body 40. The aft-facing engagement surface 48 is shaped to mate with the attachment feature 66 included in the roots 60 of the blades 26. Illustratively, the outer radial surface 46, the fore-facing surface 47, and the aft-facing engagement surface 48 are continuous such that the roots 60 of the blades 26 are blocked from moving axially or radially out of the blade-receiver channel 38. In other words, the outer radial surface 46, the fore-facing surface 47, and the aft-facing engagement surface 48 are formed without holes or slots that would allow the blades 26 to pass through without moving the disk segments 34, 36 apart.

The aft-disk segment 36 includes an aft body 50 and an aft band 52 that extends circumferentially around the aft body 50 as shown in FIGS. 2-4. The aft body 50 configured to couple with the shaft of the gas turbine engine 10 to transmit power to the shaft. The aft band 52 extends radially away from the aft body 50 and cooperates with the aft body 50 to define a circumferentially extending passage 55 that forms a portion of the blade-receiver channel 38 as shown in FIG. 4. The aft-disk segment 36 and the fore-disk segment 34 are blocked from moving axially relative to each other and are coupled to rotate with one another.

The aft band 52 includes an outer radial surface 56, a fore-facing engagement surface 57, and an aft-facing surface 58 as shown in FIG. 4. The fore-facing engagement surface 57 extends from the outer radial surface 56 toward the aft body 50. The fore-facing engagement surface 57 is shaped to mate with the attachment portions 66 of the roots 60 of the blades 26. Illustratively, the outer radial surface 56, the fore-facing engagement surface 57, and the aft-facing surface 58 are continuous such that the roots 60 of the blades 26 are blocked from moving axially or radially out of the blade-receiver channel 38. In other words, the outer radial surface 56, the fore-facing engagement surface 57, and the aft-facing surface 58 are formed without holes or slots sized that would allow the blades 26 to pass through without moving the disk segments apart.

Illustratively, the blade-receiver channel 38 is dovetail shaped when viewed circumferentially relative to the axis 11 as shown in FIG. 4. In other embodiments, the blade-receiver channel 38 is an alternative shape such as, for example, fir tree shape when viewed circumferentially. The blade-receiver channel 38 extends circumferentially and blocks radial movement of the blades 26 and platforms 28 out of the blade-receiver channel 38. The aft-facing engagement surface 48 included in the fore band 42 and the fore-facing engagement surface 57 included in the aft band 44 cooperate to block the roots 60 of the blades 26 from exiting the blade-receiver channel 38 at any orientation of the blades 26 relative to the axis 11. For example, the blades 26 are blocked at all circumferential locations about the axis 11 and are blocked if the blades 26 are tilted or angled relative to the disk segments 34, 36. As a result, the fore-disk segment 34 is moved axially relative to the aft-disk segment 36 to insert or remove blades 26 during assembly. In some embodiments, the disk segments 34, 36 clamp the roots 60 of the blades 26 therebetween.

Figure 5:
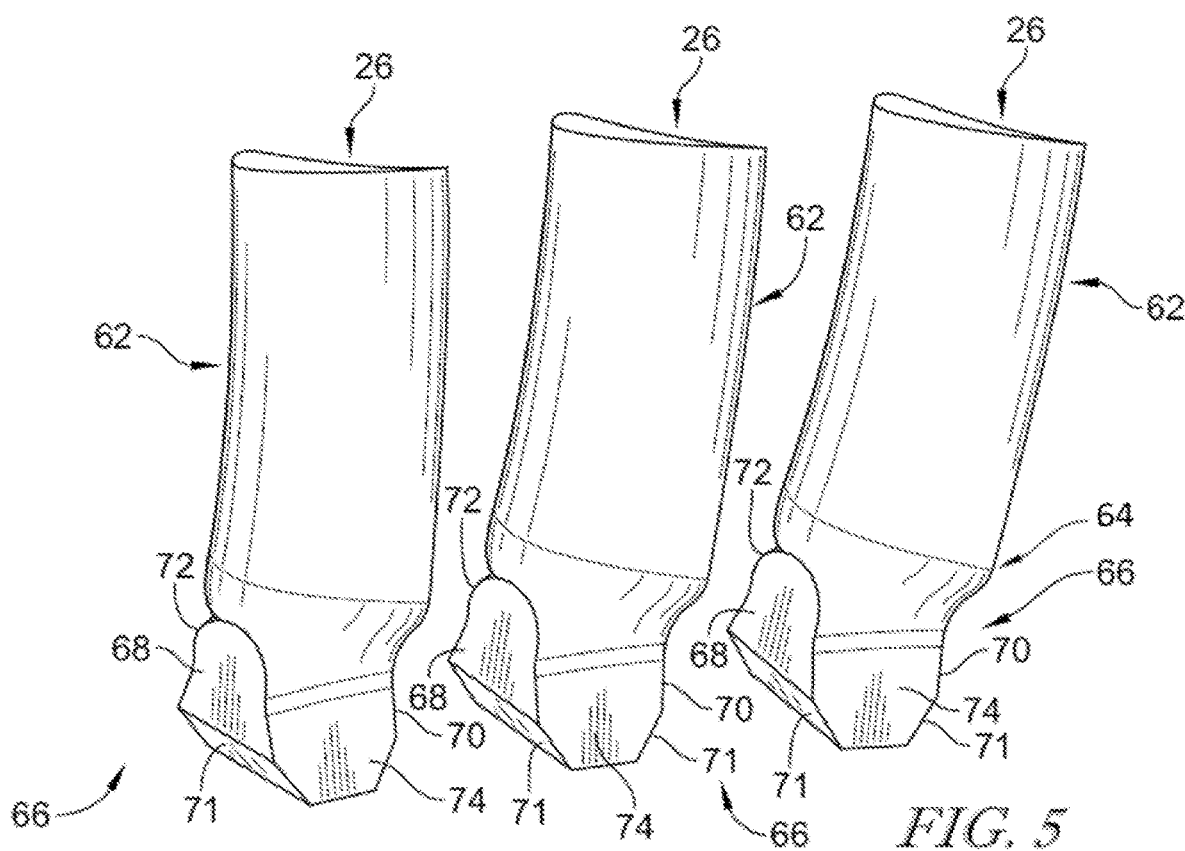
FIG. 5 is a perspective view of FIG. 2 depicting in isolation a plurality of the blades having circumferentially extending dovetail roots.

Each blade 26 includes the root 60 and the airfoil 62 that extends radially away from the root 60 relative to the center axis 11 as suggested in FIGS. 3 and 5. The root 60 of each blade 26 is received in the blade-receiver channel 38 to couple the blades 26 to the disk 24 for rotation with the disk 24. The airfoils 62 are shaped to be pushed circumferentially by the hot gases moving in the flow path 25 to cause the turbine wheel assembly 20 to rotate about the center axis 11 during operation of the gas turbine engine 10.

The root 60 of each blade 26 includes a stem 64 coupled with the airfoil 62 and an attachment feature 66 coupled with the stem 64 as shown in FIG. 5. The attachment feature 66 of the blade 26 is illustratively dovetail shaped when viewed circumferentially relative to the axis 11. The attachment feature 66 includes a first side face 68, a second side face 70 spaced apart circumferentially from the first side face 68, a fore engagement face 72, and an aft engagement face 74 spaced apart axially from the fore engagement face 72 as shown in FIGS. 3 and 5. The first side face 68 and the second side face 70 extend between and interconnect the fore engagement face 72 and the aft engagement face 74. The first side face 68 and the second side face 70 are planar in the illustrative embodiment with an axially extending cutout 71 on the bottom of each side face 68, 70.

The fore engagement face 72 engages directly the aft-facing engagement surface 48 of the fore-disk segment 34 as shown in FIG. 4. The aft engagement face 74 engages directly the fore-facing engagement surface 57 of the aft-disk segment 36. The fore engagement face 72 and the aft-facing engagement surface 48 of the fore-disk segment 34 have complementary shapes. The aft engagement face 74 and the fore-facing engagement surface 57 of the aft-disk segment 36 have complementary shapes.

Illustratively, the root 60 and the airfoil 62 of each blade 26 are integrally formed such that each blade 26 is a one-piece integral component. The blades 26 comprise ceramic matrix composite materials in some embodiments. The blade 26 comprises only ceramic matrix composite materials in the illustrative embodiment. In other embodiments, the blades 26 may comprise one or more of ceramic matrix composite materials, composite materials, and metallic materials.

Figure 6:
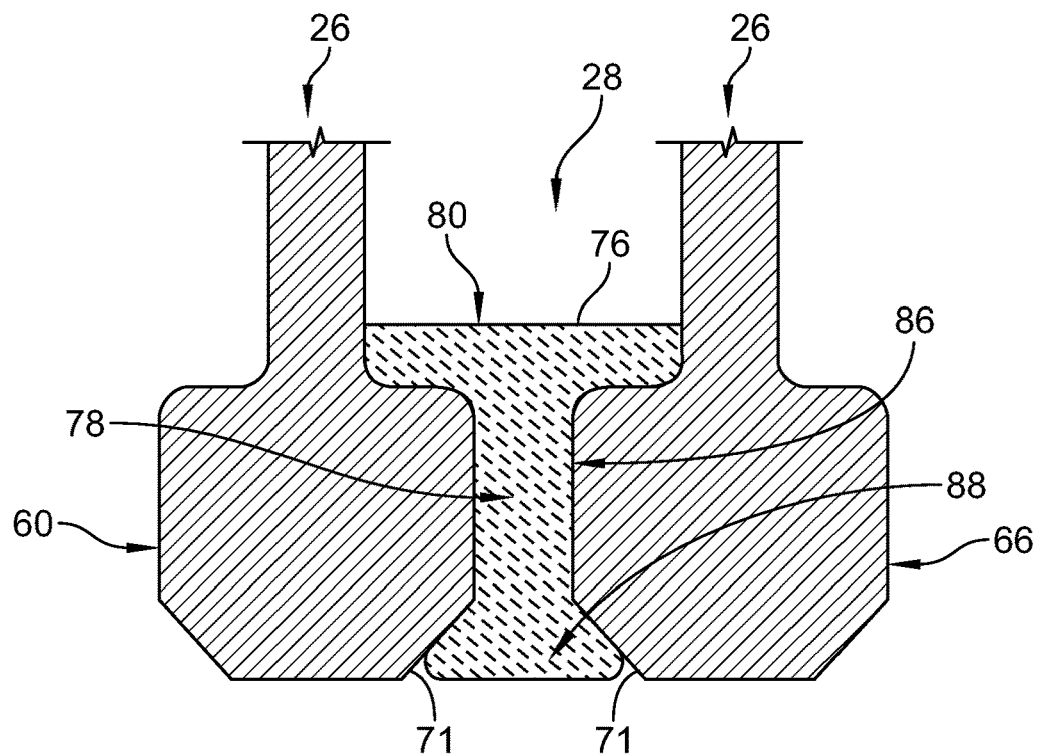
FIG. 6 is a diagrammatic and an enlarged axial view of a portion of the turbine wheel assembly of FIG. 2 showing the confronting relationship between the axially extending dovetail root of a platform and the circumferentially extending dovetail root of two blades.
Figure 7:
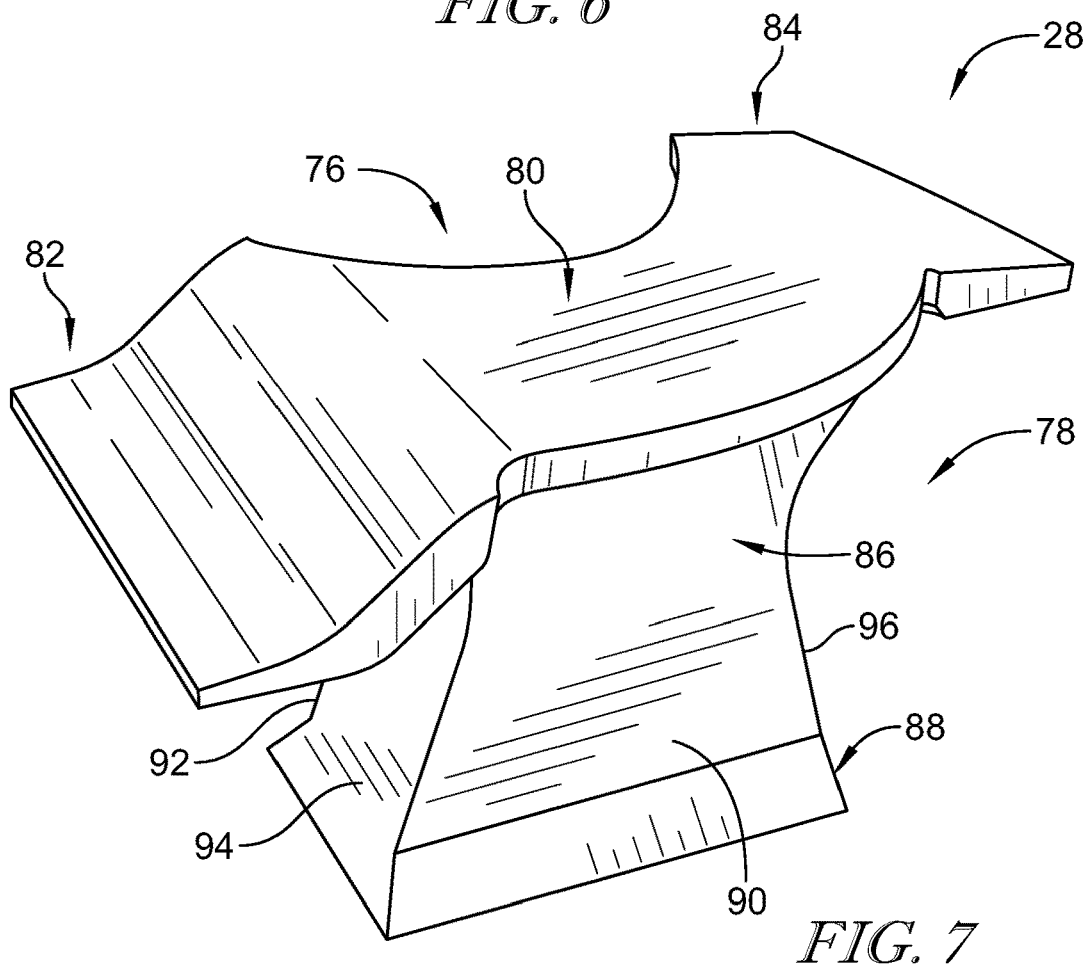
FIG. 7 is an enlarged perspective view of a platform of the plurality of platforms in FIG. 2, the platform having an attachment portion and a radial outer wall configured to be arranged partway around the blades having fore and aft wings.

The platforms 28 include the outer radial wall 76 and the rib 78 as shown in FIGS. 6 and 7. The outer radial wall 76 is arranged partway around the blade 26 to define the boundary of the flow path 25 of the gases. The rib 78 extends radially inward from the outer radial wall 76 and is located in the blade-receiver channel 38 to couple the platform 28 with the disk 24. The outer radial wall 76 of the platform 28 includes a first edge and a second edge spaced apart circumferentially from the first edge and the rib 78 is spaced apart circumferentially from the first and second edges of the outer radial wall 76.

The outer radial wall 76 of the platform 28 includes a panel 80, a fore wing 82, and an aft wing 84 as shown in FIGS. 6 and 7. The panel 80 is configured to be arranged partway around the blades 26. The fore wing 82 extends axially forward away from the panel 80 toward a front of the fore-disk segment 34. The aft wing 84 extends axially aft away from the panel 80 toward a rear of the aft-disk segment 36. The fore wing 82 and the aft wing 84 may engage portions of the turbine vane assemblies 22 located fore and aft of the turbine wheel assembly 20.

The rib 78 includes a stem 86 and an attachment feature 88 as shown in FIG. 7. The stem 86 extends axially along an inner surface of the fore wing 82, the panel 80, and the aft wing 84 to provide support for the fore wing 82 and aft wing 84. The attachment feature 88 is located in the blade-receiver channel to couple the platform 28 with the disk 24.

The attachment feature 88 of the platform 28 is dovetail shaped when viewed axially as shown in FIG. 6. The attachment feature 66 included in the root 60 of the blade 26, or cutout 71, and the attachment feature 88 included in the rib 78 of the platform overlap circumferentially as shown in FIGS. 2 and 6 such that the root of the blade is configured to block radial outward movement of the platform during use of the gas turbine engine.

The attachment feature 88 has a first side face 90 and a second side face 92 spaced apart circumferentially from the first side face 90. The second side face 92 of the attachment feature 66 of the platform 28 engages directly the first side face 68 of the blade 26. A second side face 70 of a neighboring blade 26 engages directly the first side face 90 of the platform. The attachment feature 88 further includes a fore engagement surface 94 and an aft engagement surface 96 spaced apart from the fore engagement surface 94. The fore engagement surface 94 and the aft engagement surface 96 extend between and interconnect the first and second side surfaces 90, 92. The fore engagement surface 94 may engage directly the aft-facing engagement surface 48 of the disk 24 and the aft engagement surface 96 may engage directly the fore-facing engagement surface 57 of the disk 24.

Illustratively, the outer radial wall 76 and the rib 78 are integrally formed such that each platform 28 is a one-piece integral component. The platforms 28 comprise ceramic matrix composite materials in some embodiments. The platforms 28 comprise only ceramic matrix composite materials in the illustrative embodiment. In other embodiments, the platforms 28 may comprise one or more of ceramic matrix composite materials, composite materials, and metallic materials.

Illustratively, the attachment features 66, 88 are dovetail shaped when viewed circumferentially. In other embodiments, the blades 26 and the platforms 28 may have other shaped attachment features 66, 88 when viewed circumferentially relative to the axis 11 such as, for example, fir tree shape. In other embodiments, individual or combinations of features of the disk 24, the blades 26, and the platforms 28 may be incorporated into other wheel assemblies such as, for example, compressor wheel assemblies.

Figure 8:
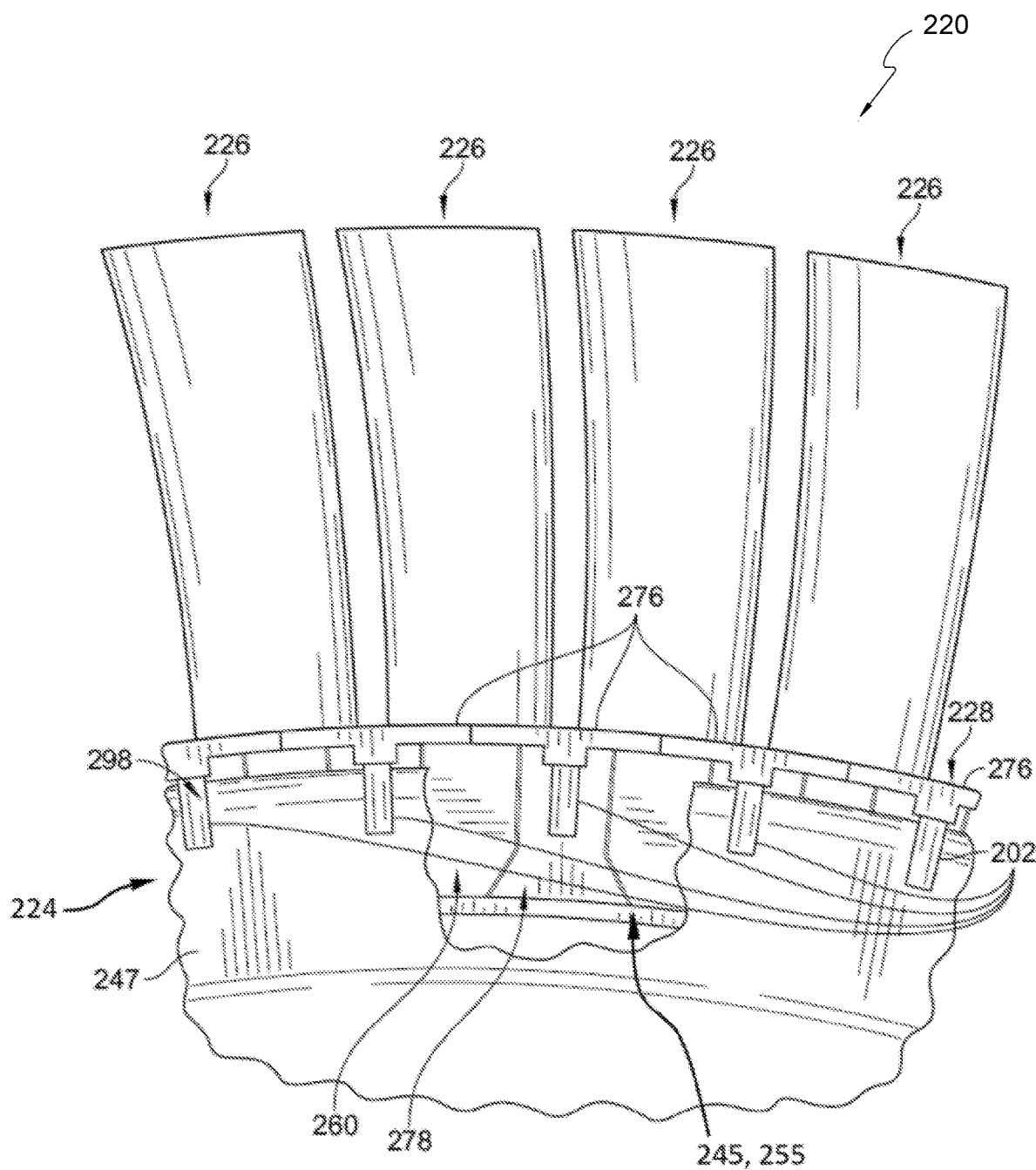
FIG. 8 is an axial and partially cut-away view of a portion of another embodiment of a turbine wheel assembly adapted for use in the gas turbine engine of FIG. 1, showing that the turbine wheel assembly includes a multi-piece disk, a plurality of blades having circumferentially extending dovetailed roots, and a plurality of platforms having axially extending dovetail roots located between the roots of the plurality of blades and axially extending support strut extending forward and aft the root.
Figure 9A:
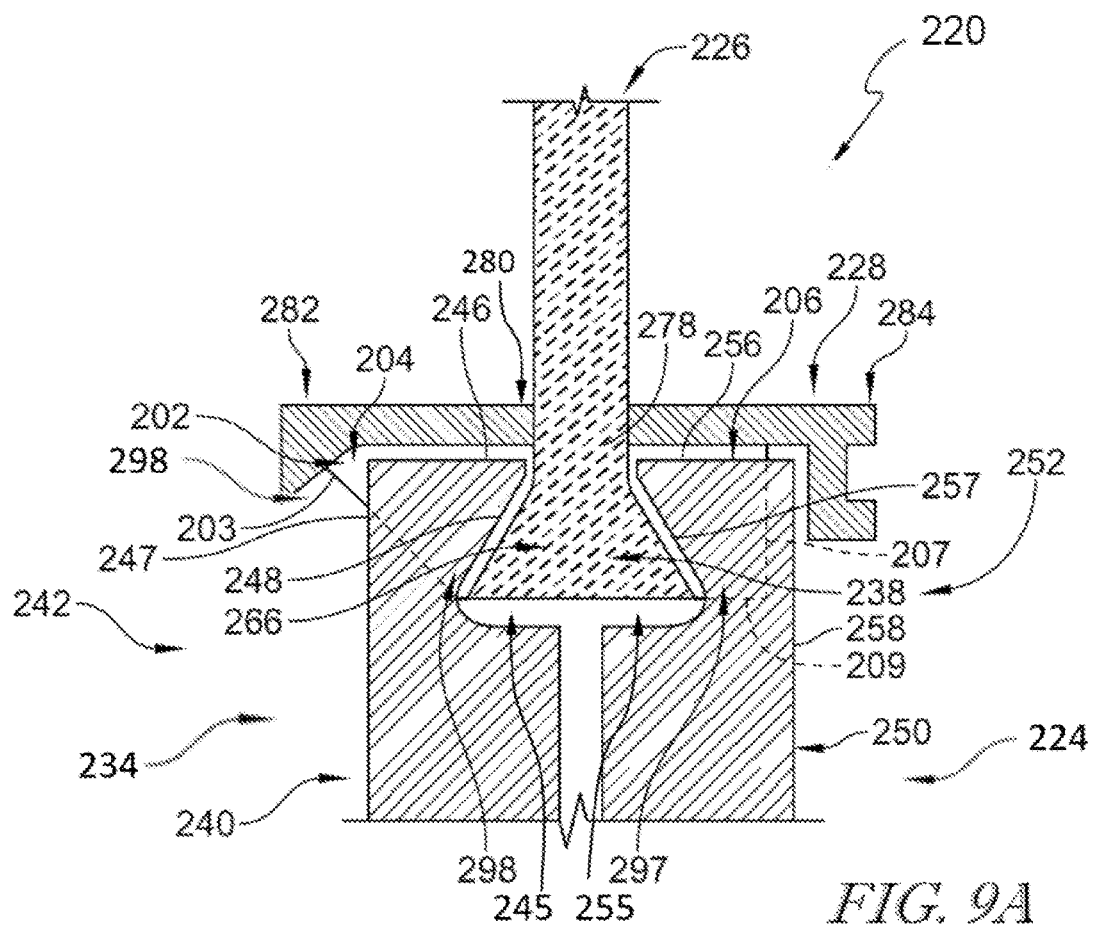
FIG. 9A is a diagrammatic and an enlarged circumferential sectional view of a portion of the turbine wheel assembly of FIG. 8 showing the interface of the blade root with the multi-piece disk and the interface of a platform support strut with the multi-piece disk.
Figure 9B:
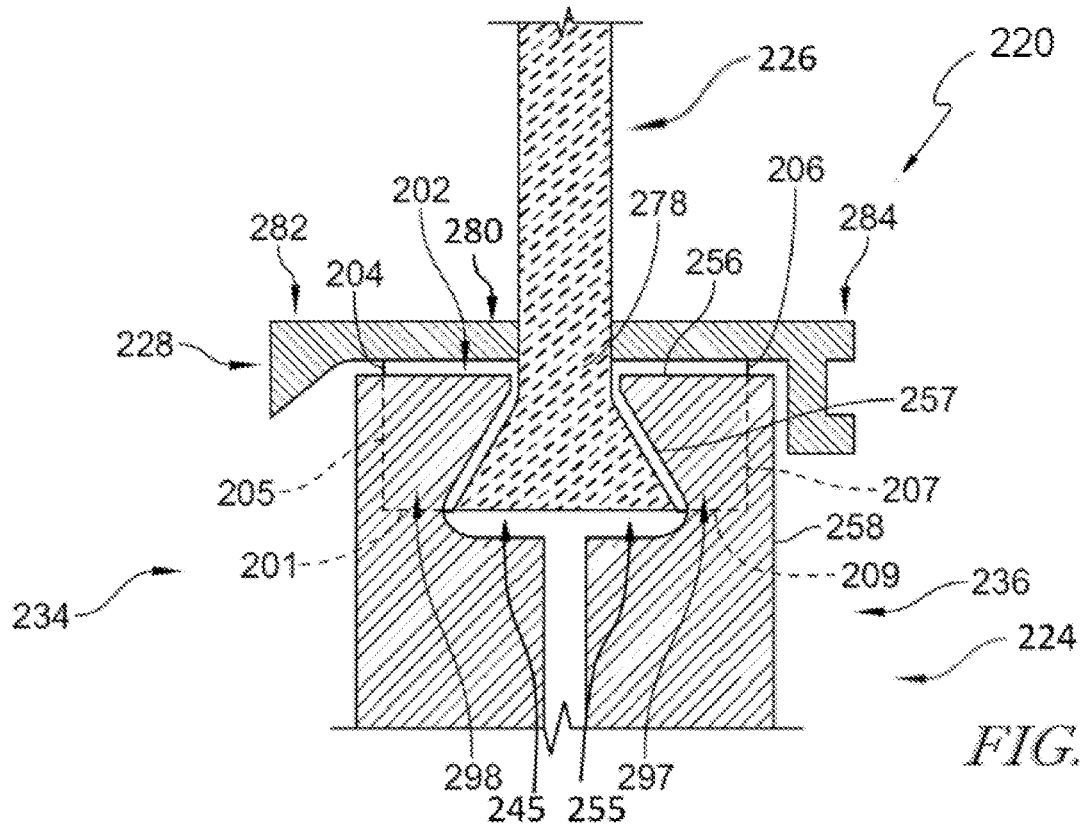
FIG. 9B is a diagrammatic and an enlarged sectional view of a portion of the turbine wheel assembly of FIG. 8 according to another embodiment showing the interface of the blade root with the multi-piece disk and the interface of a platform support strut with the multi-piece disk.

Another embodiment of a turbine wheel assembly 220 in accordance with the present disclosure is shown in FIGS. 8, 9A, and 9B. The turbine wheel assembly 220 is substantially similar to the turbine wheel assembly 20 shown in FIGS. 1-7 and described herein. Accordingly, similar reference numbers in the 200 series indicate features that are common between the turbine wheel assembly 20 and the turbine wheel assembly 220. The description of the turbine wheel assembly 20 is incorporated by reference to apply to the turbine wheel assembly 220, except in instances when it conflicts with the specific description and the drawings of the turbine wheel assembly 220.

As illustrated in FIG. 8, platforms 228 are arranged between each blade 226 around the disk 224. Blades 226 and blade roots 260 are previously described with respect to FIGS. 2-4. The platforms 228 include an outer radial wall 276 and attachment rib 278. The outer radial wall 276 is arranged partway around the blade 226 to define the boundary of the flow path 25 of the gases. The rib 278 extends radially inward from the outer radial wall 276 and is located in the blade-receiver channel 238 to couple the platform 228 with the disk 224. The outer radial wall 276 of the platform 28 includes a first edge and a second edge spaced apart circumferentially from the first edge. The rib 278 is spaced apart circumferentially from the first and second edges of the outer radial wall 276.

The outer radial wall 276 of the platform 228 includes a panel 280, a fore wing 282, and an aft wing 284 as shown in FIG. 9A. The panel 280 is configured to be arranged partway around the blades 226. The fore wing 282 extends axially forward away from the panel 280 toward a front of the fore-disk segment 234. The aft wing 84 extends axially aft away from the panel 280 toward a rear of the aft-disk segment 236. The fore wing 282 and the aft wing 284 may engage portions of the turbine vane assemblies 222 located fore and aft of the turbine wheel assembly 220.

In this embodiment, the rib 278 of each platform 228 may include a support strut 202 that extends axially forward and aft from the rib 278 interconnecting the rib 278 and the panel 280 of the platform 228. The support strut 202 interconnects with the fore wing 282 and the aft wing 284 to limit deflections of the wings. As illustrated in FIG. 8, the support strut 202 has a width that is substantially less than the width of the rib 278, or the blade root 260. The support strut 202 may have a length that is less than the length of the root 260 as illustrated in FIG. 8 or may extend to the bottom of the root 260 as illustrated in FIG. 9A. The support strut 202 can include a fore support 204 and an aft support 206.

As illustrated in FIG. 9A, the fore support 204 may be an angular geometry that forms a linear angled fore engagement surface 203 between the rib 278 and the platform 228. In this embodiment, the aft support 206, as illustrated, includes a bottom surface 209 that extends from the rib 278 axially aft and terminates at a radially extending aft engagement surface 207, which is arranged parallel to an outer radial surface 246 of the fore band 242. Optionally, the configuration may be reversed so that the aft support 206 forms a linear angled engagement surface and fore support 204 forms a bottom surface and radially extending fore engagement surface.

Alternatively, as illustrated in FIG. 9B, the fore support 204 includes a bottom surface 201 that extends from the rib 278 axially forward and terminates at a radially extending fore engagement surface 205. The aft support 206 as illustrated includes a bottom surface 209 that extends from the rib 278 axially aft and terminates at a radially extending aft engagement surface 207.

The disk 224 is illustratively a multi-piece disk 224 that includes a fore-disk segment 234 and an aft-disk segment 236 as shown in FIGS. 8 and 9A-9B. The multi-piece disk 224 is adapted to rotate about the axis 11 during use of the gas turbine engine 10. The aft-disk segment 236 is located axially aft of the fore-disk segment 234 to define a blade-receiver channel 238 that extends circumferentially around the axis 211. The blade-receiver channel 238 is sized to receive a portion of the blades 226 and the platforms 228. In the illustrative embodiment, the blade-receiver channel 238 is dovetail shaped when viewed circumferentially in FIGS. 9A and 9B. The fore-disk segment 234 and the aft-disk segment 236 are made of metallic materials in the illustrative embodiment.

The fore-disk segment 234 includes a fore body 240 and a fore band 242 that extends circumferentially around the fore body 240 as shown in FIG. 9A. The fore body 240 is configured to couple with the shaft of the gas turbine engine 10 to transmit power to the shaft. The fore band 242 extends radially away from the fore body 240 and cooperates with the fore body 240 to define a circumferentially extending passage 245 that forms a portion of the blade-receiver channel 238 as shown in FIG. 9A.

The fore band 242 includes an outer radial surface 246, a fore-facing surface 247, and an aft-facing engagement surface 248. The aft-facing engagement surface 248 extends from the outer radial surface 246 toward the fore body 240. The aft-facing engagement surface 248 is shaped to mate with the attachment feature 266 included in the roots 260 of the blades 226.

The fore band 242 further includes a plurality of strut-receiver slots 298 extending radially into the fore band 242 from the outer radial surface 246, and extending axially through the fore band 242 from the fore-facing engagement surface 224 to the aft-facing engagement surface 248 as shown in FIGS. 8 and 9A. The strut-receiver slot 298 is sized to receive the fore support 204 of support strut 202 of the platform 228. The fore band 242 is configured to have a plurality of strut-receiver slots 298 spaced circumferentially around the fore-disk segment 234. Alternatively, strut-receiver slot 298 may form a blind slot in that it does not extend through a fore-facing surface 247 as shown by the dotted line in FIG. 9B and instead faces radially extending fore engagement surface 205 and the bottom surface 201 of fore support 204 in confronting relation.

Illustratively, the outer radial surface 246, the fore-facing surface 247, and the aft-facing engagement surface 248 are continuous other than the strut-receiver slots 298 such that the roots 260 of the blades 226 are blocked from moving axially or radially out of the blade-receiver channel 238. In other words, the outer radial surface 246, the fore-facing surface 247, and the aft-facing engagement surface 248 are formed without holes or slots that would allow the blades 226 to pass through.

The aft-disk segment 236 includes an aft body 250 and an aft band 252 that extends circumferentially around the aft body 250 as shown in FIGS. 8, 9A, and 9B. The aft body 250 is configured to couple with the shaft of the gas turbine engine 10 to transmit power to the shaft. The aft band 252 extends radially away from the aft body 250 and cooperates with the aft body 250 to define a circumferentially extending passage 255 that forms a portion of the blade-receiver channel 238. The aft-disk segment 236 and the fore-disk segment 234 are blocked from moving axially relative to each other and are coupled to rotate with one another.

The aft band 252 includes an outer radial surface 256, a fore-facing engagement surface 257, and an aft-facing surface 258 as shown in FIG. 9A. The fore-facing engagement surface 257 extends from the outer radial surface 256 toward the aft body 250. The fore-facing engagement surface 257 is shaped to mate with the attachment portions 266 of the roots 260 of the blades 226.

The aft band 252 further includes a strut-receiver slot 297 extending radially into the aft band 252 from the outer radial surface 256, and extending axially through the aft band 252 from the fore-facing engagement surface 257 towards, but not through, the aft-facing engagement surface 258 forming a blind slot. The strut-receiver slot 297 is sized to receive an aft support 206 of support strut 202 of the platform 228. The aft band 252 is configured to have a plurality of strut-receiver slots 297 spaced circumferentially around the aft-disk segment 236. Alternatively, strut-receiver slot 297 may extend fully through the aft-facing surface as described above with respect to the strut-receiver slot 298.

Illustratively, the outer radial surface 256, the fore-facing engagement surface 257, and the aft-facing surface 258 are continuous other than the strut-receiver slots 297 such that the roots 260 of the blades 226 are blocked from moving axially or radially out of the blade-receiver channel 238. In other words, the outer radial surface 256, the fore-facing engagement surface 257, and the aft-facing surface 258 are formed without holes or slots sized that would allow the blades 26 to pass through.

As ceramic matrix composites (CMC) materials and designs mature, they may be used in turbine blade applications. Ceramic matrix composite components may be capable of operating at higher temperatures and deliver cooling air savings and/or specific fuel consumption reductions. Ceramic matrix composite components may offer weight reductions as compared to a metallic blade system. Ceramic matrix composite blades may be lighter than metallic blades and the size and weight of the disks may also be reduced when using ceramic matrix composite blades.

The ceramic matrix composite material may also cause a reduction in strength as compared to metallic blades. Using ceramic matrix composite blades with designs similar to or based on metallic blades in an existing systems may not be practical. The present disclosure provides a wheel assembly configured to reduce the stress at the attachment of the blade by flipping the orientation of the attachment feature of the blade to extend circumferentially.

Generally attachments on blades are oriented with the axis of the engine (axially). Flipping this general orientation from axially to circumferential (or tangential) may allow the stalk/attachment region to be larger/thicker effectively reducing the pressure over area stress. In some embodiments, the platform features are removed from the blade component and instead incorporated as an offloaded part. With such configurations, the blade attachment may not support the centrifugal load associated with the platforms. The platform component of each embodiment of the present disclosure could be made from metallic or ceramic matrix composite materials.

In some embodiments, the platform has a dovetail attachment feature that contacts chamfered/angled faces on the tangential ends of the blade attachment features. This configuration allows the attachment rib in the platform to have radially aligned edges (front and back) which allows the platforms to have more complex "angel wing" or vane interface features. Since the platform attachment is not shaped to match the blade circumferential dovetail, it permits the option of having the platform slide radially into one of the forward or aft disks during assembly.

In these embodiments, the attachment feature in the platform can include a support strut that can reach further forward and aft to limit angel wing deflections. The disk has matching slots to accommodate these support strut features in the platform.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A wheel assembly for a gas turbine engine, the wheel assembly comprising
    a multi-piece disk adapted to rotate about an axis during use of the gas turbine engine, the multi-piece disk including a fore-disk segment and an aft-disk segment located axially aft of the fore-disk segment to define a dovetail shaped blade-receiver channel that extends circumferentially around the axis,
    a blade adapted to interact with gases during use of the gas turbine engine, the blade including a root located in the dovetail shaped blade-receiver channel and an airfoil that extends radially away from the root, and the root being dovetail shaped when viewed circumferentially relative to the axis, and
    a platform that includes an outer radial wall arranged partway about the blade to define a boundary of a flow path of the gases, a stem that extends radially inward from the outer radial wall, and an attachment feature coupled with the stem and located in the dovetail shaped blade-receiver channel and the attachment feature is dovetail shaped when viewed axially relative to the axis,
    wherein the root of the blade is formed to define an axially extending cutout and a portion of the attachment feature of the platform is located in the cutout such that the root of the blade is configured to block radial outward movement of the platform during use of the gas turbine engine.

2. The wheel assembly of claim 1, wherein the axially extending cutout is defined by a mating surface of the root and the mating surface engages directly the attachment feature of the platform.

3. The wheel assembly of claim 1, wherein the fore-disk segment includes a fore body and a fore band that extends circumferentially around the fore body to define a first portion of the dovetail shaped blade-receiver channel, the aft-disk segment includes an aft body and an aft band that extends circumferentially around the aft body to define a second portion of the dovetail shaped blade-receiver channel, and the fore band and the aft band are each solid and continuous to block the root of the blade and the attachment feature of the platform from moving axially out of the dovetail shaped blade-receiver channel.

4. The wheel assembly of claim 1, wherein the platform includes a fore wing that extends axially forward from the outer radial wall toward a front face of the fore-disk segment and an aft wing that extends axially rearward from the outer radial wall toward a rear face of the aft-disk segment.

5. The wheel assembly of claim 4, wherein the platform further includes a fore support strut coupled with the fore wing, the outer radial wall, and the stem of the platform.

6. The wheel assembly of claim 5, wherein the fore-disk segment is formed to define a strut-receiver slot that extends radially inward into the fore-disk segment and at least a portion of the fore support strut is located in the strut-receiver slot.

7. A wheel assembly comprising
    a disk formed to define a blade-receiver channel that extends circumferentially around an axis,
    a blade that includes a circumferentially extending root located in the blade-receiver channel and an airfoil that extends radially away from the root, and
    a platform that includes an outer radial wall arranged partway about the blade, a stem that extends radially inward from the outer radial wall, and an axially extending attachment feature coupled with the stem and located in the blade-receiver channel,
    wherein the root of the blade includes a front surface and a rear surface that is spaced apart axially from the front surface, the front surface and the rear surface engage the disk to block the blade from moving radially out of the blade-receiver channel, and a portion of the root of the blade overlaps radially with a portion of the attachment feature of the platform to block radial outward movement of the platform.

8. The wheel assembly of claim 7, wherein the root of the blade is formed to define an axially extending cutout and a portion of the attachment feature of the platform extends circumferentially into the cutout.

9. The wheel assembly of claim 7, wherein the disk includes a fore-disk segment and an aft-disk segment that is located axially aft of the fore-disk segment, the fore-disk segment includes a fore body and a fore band that extends circumferentially around the fore body to define a first portion of the blade-receiver channel, the aft-disk segment includes an aft body and an aft band that extends circumferentially around the aft body to define a second portion of the blade-receiver channel, and the fore band and the aft band are each solid and continuous to block the blade and the platform from moving axially out of the blade-receiver channel.

10. The wheel assembly of claim 7, wherein the platform includes a fore wing that extends axially forward from the outer radial wall toward a front face of the disk and an aft wing that extends axially rearward from the outer radial wall toward a rear face of the disk.

11. The wheel assembly of claim 10, wherein the platform further includes a fore support strut coupled with the fore wing, the outer radial wall, and the stem of the platform.

12. The wheel assembly of claim 11, wherein the disk includes a fore-disk segment and an aft-disk segment that is located axially aft of the fore-disk segment, the fore-disk segment includes a fore body and a fore band that extends circumferentially around the fore body to define a first portion of the blade-receiver channel, and the fore band is formed to define a strut-receiver slot that extends radially inward into the fore band and at least a portion of the fore support strut is located in the strut-receiver slot.

13. The wheel assembly of claim 11, wherein the fore support strut includes a fore engagement surface that is one of a linear angled engagement surface or a radially extending engagement surface that is arranged perpendicular to the axis.

14. The wheel assembly of claim 7, wherein the root is dovetail shaped when viewed circumferentially relative to the axis and the attachment feature is dovetail shaped when viewed axially relative to the axis.

15. A method comprising
providing a multi-piece disk that includes a first-disk segment and a second-disk segment, a blade that includes a circumferentially extending root and an airfoil that extends radially away from the root relative to an axis, and a platform that includes an outer radial wall, a stem, and an axially extending attachment feature,
locating the root of the blade in a circumferentially extending passage formed in the first-disk segment,
locating the attachment feature of the platform in the circumferentially extending passage formed in the first-disk segment, and
moving the second-disk segment toward the first-disk segment to locate the root of the blade and the attachment feature of the platform in a circumferentially extending passage formed in the second-disk segment,
wherein the platform includes a first wing that extends axially away from the outer radial wall, a second wing that extends axially away from the outer radial wall, and a support strut coupled with the first wing, the outer radial wall, and the stem of the platform.

16. The method of claim 15, further comprising moving the platform relative to the blade to cause a portion of the root of the blade to overlap radially a portion of the attachment feature of the platform.

17. The method of claim 15, wherein the root is dovetail shaped when viewed circumferentially and the attachment feature is dovetail shaped when viewed axially.

* * * * *